(12) United States Patent
Fu et al.

(10) Patent No.: US 10,782,877 B2
(45) Date of Patent: *Sep. 22, 2020

(54) SIMPLIFIED USER INTERFACE FOR SMART DEVICES

(71) Applicant: International Business Machines Corporation, Armonk, NY (US)

(72) Inventors: Yan Bin Fu, Ningbo (CN); Qingjun Gao, Beijing (CN); Shuangyin Liu, Beijing (CN); Yi Wu, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,500

(22) Filed: May 22, 2019

(65) Prior Publication Data

US 2019/0272096 A1    Sep. 5, 2019

Related U.S. Application Data

(63) Continuation of application No. 15/447,995, filed on Mar. 2, 2017, now Pat. No. 10,365,823.

(51) Int. Cl.
*G06F 3/0488* (2013.01)
*G06F 3/023* (2006.01)
(Continued)

(52) U.S. Cl.
CPC ........ *G06F 3/04886* (2013.01); *G06F 3/0236* (2013.01); *G06F 3/0482* (2013.01); *G06F 3/04847* (2013.01)

(58) Field of Classification Search
CPC .. G06F 3/048; G06F 3/04847; G06F 3/04886; G06F 3/0236
See application file for complete search history.

(56) References Cited

U.S. PATENT DOCUMENTS 6,011,542 A    1/2000 Durrani et al.
6,744,427 B2   6/2004 Maglio et al.
(Continued)

OTHER PUBLICATIONS

Non Final Office Action dated Nov. 30, 2018 for U.S. Appl. No. 15/447,995; pp. 18.

(Continued)

*Primary Examiner* — Amy M Levy
(74) *Attorney, Agent, or Firm* — Kelli D. Morin (57) ABSTRACT

A system, method and program product for implementing a simplified touch screen interface for collecting character data. a device is disclosed having a touch screen interface, wherein the touch screen interface includes: a primary view that displays rotating character sets on a wheel, wherein each one of the character sets sequentially rotates into an active position, wherein a character set in the active position is selectable in response to a first touch to a uniform input region, and wherein the wheel automatically begins rotating when a user activates the touch screen interface; a secondary view that displays rotating characters on the wheel, wherein each one of the rotating characters sequentially rotates into the active position, and wherein a character in the active position is selectable in response to a second touch to the uniform input region; and wherein the rotating characters displayed in the secondary view are determined based on the character set selected in the primary view.

12 Claims, 4 Drawing Sheets

(51) Int. Cl.
*G06F 3/0482* (2013.01)
*G06F 3/0484* (2013.01)

(56) References Cited

U.S. PATENT DOCUMENTS

| | | |
|---|---|---|
| 7,385,592 B2 | 6/2008 | Collins |
| 7,868,787 B2 | 1/2011 | Chung et al. |
| 7,973,762 B2 | 7/2011 | Naimo |
| 7,973,770 B2 | 7/2011 | Takkonen |
| 8,151,209 B2 | 4/2012 | Law et al. |
| 8,429,692 B2 | 4/2013 | Zeldis et al. |
| 8,487,877 B2 | 7/2013 | Murphy |
| 8,766,918 B2 | 7/2014 | Aliakseyeu et al. |
| 8,780,043 B2 | 7/2014 | Yoshioka |
| 8,839,123 B2 | 9/2014 | Landry |
| 9,140,572 B2 | 9/2015 | Millington |
| 9,292,082 B1 | 3/2016 | Patel et al. |
| 2001/0012450 A1 | 8/2001 | Wakui |
| 2001/0045937 A1 | 11/2001 | Hagiwara et al. |
| 2002/0097227 A1 | 7/2002 | Chu et al. |
| 2002/0145587 A1 | 10/2002 | Watanabe |
| 2003/0197736 A1 | 10/2003 | Murphy |
| 2004/0067762 A1 | 4/2004 | Balle |
| 2004/0070567 A1 | 4/2004 | Longe et al. |
| 2005/0140657 A1 | 6/2005 | Park et al. |
| 2005/0195159 A1 | 9/2005 | Hunleth et al. |
| 2006/0095844 A1 | 5/2006 | Van Leeuwen |
| 2006/0217144 A1 | 9/2006 | Bonnelykke Kristensen et al. |
| 2006/0258390 A1 | 11/2006 | Cui et al. |
| 2007/0155434 A1 | 7/2007 | Jobs et al. |
| 2007/0205920 A1* | 9/2007 | Cho ............... G06F 3/0236 341/35 |
| 2007/0296704 A1 | 12/2007 | Park et al. |
| 2008/0024452 A1 | 1/2008 | Ford et al. |
| 2008/0119238 A1 | 5/2008 | Kwon et al. |
| 2008/0168381 A1 | 7/2008 | Nelson et al. |
| 2009/0002335 A1 | 1/2009 | Chaudhri |
| 2009/0048020 A1 | 2/2009 | Gruen et al. |
| 2010/0141609 A1 | 6/2010 | Frisbee |
| 2011/0007035 A1 | 1/2011 | Shai |
| 2011/0115714 A1 | 5/2011 | Lecocq |
| 2013/0055955 A1 | 3/2013 | Nyberg |
| 2013/0234949 A1 | 9/2013 | Chornenky |
| 2014/0298233 A1* | 10/2014 | Pettey ............... G06F 3/0488 715/771 |
| 2016/0070441 A1 | 3/2016 | Paek et al. |
| 2016/0370994 A1 | 12/2016 | Galu, Jr. |
| 2018/0091848 A1 | 3/2018 | Jain |

OTHER PUBLICATIONS

Notice of Allowance and Fee(s) Due dated Mar. 11, 2019 for U.S. Appl. No. 15/447,995; pp. 13.

* cited by examiner

SIMPLIFIED USER INTERFACE FOR SMART DEVICES

TECHNICAL FIELD

The subject matter of this invention relates to touch screen user interfaces, and more particularly to a simplified touch screen interface for smart devices.

BACKGROUND

With the expanding use of smart technologies in an ever growing number of devices (e.g., wearables, Internet of Things (IoT) appliances, etc.), providing a small, simple to use interface is becoming more and more important. For instance, many interactive wearable devices are small in size to fit on a person's body, including, rings, watches, etc., and thus lack the surface area for a traditional user interface. Furthermore, as IoT technology is utilized in smaller and smaller devices, surface area may not allow for a full featured user interface. Given these size limitations, traditional user interfaces that include a touch screen displaying a full keyboard are either not practical or needed. Nonetheless, such devices may require the ability to enter textual information from time to time in order to maximize capabilities.

Accordingly, one approach is to eliminate a touch screen altogether and rely on other techniques, such as voice input. Unfortunately, voice input can add significant cost and complexity to the device and is subject to various limitations, such as audio interference from the surrounding environment, user training, language differences, etc.

Another approach is to miniaturize the interface. Unfortunately, as the size is reduced, the ability to accurately click on smaller and smaller features, such as letters on a keyboard, becomes more and more difficult. The problem is exacerbated by the fact that different users have different size fingers, and those with larger fingers will be more challenged to accurately enter textual information. Furthermore, may people, particularly the elderly, many lack the stability to accurately enter textual data on a small touchscreen keyboard.

SUMMARY

Aspects of the disclosure provide a simple to use touch screen interface for entering textual data or the like on a screen having a limited number of selectable input regions.

A first aspect discloses a device comprising a touch screen, the touch screen configured to display a touch screen interface, the touch screen interface comprising: a primary view that displays a plurality of rotating character sets on a wheel, wherein each one of the character sets sequentially rotates into a fixed active position automatically upon display of the primary view on the touch screen, wherein a character set in the active position is selectable in response to a first touch anywhere in a uniform input region, and wherein the wheel automatically begins rotating when a user activates the touch screen interface; a secondary view that replaces the primary view and displays a plurality of rotating characters on the wheel, wherein each one of the rotating characters sequentially rotates into the active position automatically after display of the secondary view on the touch screen, wherein a character in the active position is selectable in response to a second touch anywhere in the uniform input region; and a window for displaying characters selected from the secondary view, wherein the plurality of rotating characters displayed in the secondary view are determined based on the character set selected in the primary view in response to the first touch, wherein the uniform input region comprises an entire surface area of the touch screen excluding any auxiliary input regions, and wherein a first auxiliary input region controls a speed of the automatic rotation.

A second aspect discloses a computer program product stored on a computer readable storage medium, which when executed by a computing system, controls a touch screen, the touch screen configured to display a touch screen interface, the computer program product comprising: program code for generating a primary view that displays a plurality of rotating character sets on a wheel, wherein each one of the character sets sequentially rotates into a fixed active position automatically upon display of the primary view on the touch screen, wherein a character set in the active position is selectable in response to a first touch anywhere in a uniform input region, and wherein the wheel automatically begins rotating when a user activates the touch screen interface; program code for generating a secondary view that replaces the primary view and displays a plurality of rotating characters on the wheel, wherein each one of the rotating characters sequentially rotates into the active position automatically after display of the secondary view on the touch screen, wherein a character in the active position is selectable in response to a second touch anywhere in the uniform input region; and program code for generating a window for displaying characters selected from the secondary view, wherein the plurality of rotating characters displayed in the secondary view are determined based on the character set selected in the primary view in response to the first touch, wherein the uniform input region comprises an entire surface area of the touch screen excluding any auxiliary input regions, and wherein a first auxiliary input region controls a speed of the automatic rotation.

A third aspect discloses a method for implementing a touch screen configured to display a touch screen interface, the method comprising: rendering a primary view that displays a plurality of rotating character sets on a wheel, wherein each one of the character sets sequentially rotates into a fixed active position automatically upon display of the primary view on the touch screen, wherein a character set in the active position is selectable in response to a first touch anywhere in a uniform input region, and wherein the wheel automatically begins rotating when a user activates the touch screen interface; rendering a secondary view that replaces the primary view and displays a plurality of rotating characters on the wheel, wherein each one of the rotating characters sequentially rotates into the active position automatically after display of the secondary view on the touch screen, wherein a character in the active position is selectable in response to a second touch anywhere in the uniform input region; and rendering a window for displaying characters selected from the secondary view, wherein the plurality of rotating characters displayed in the secondary view are determined based on the character set selected in the primary view in response to the first touch, wherein the uniform input region comprises an entire surface area of the touch screen excluding any auxiliary input regions, and wherein a first auxiliary input region controls a speed of the automatic rotation.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
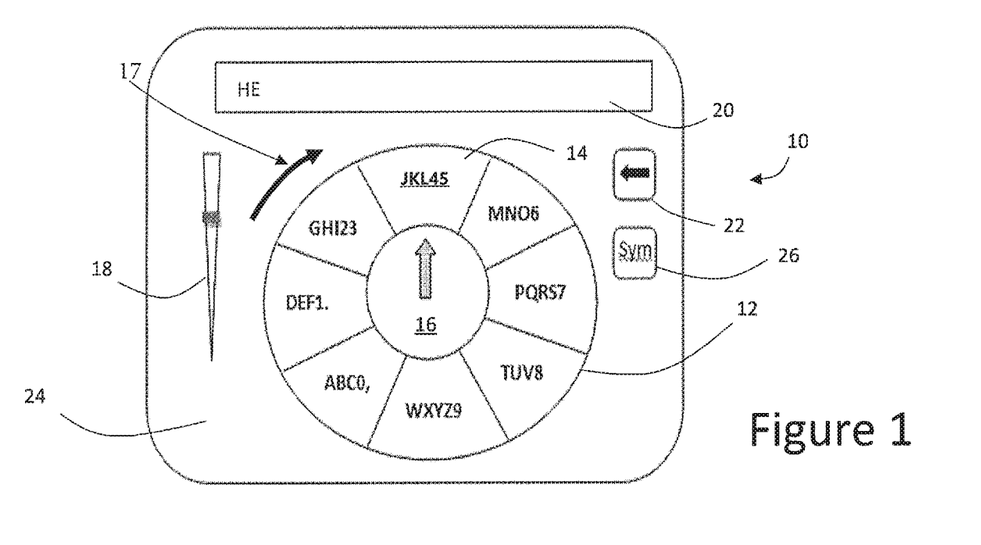
FIG. 1 shows a main screen of a simplified user interface according to embodiments.

Referring now to the drawings, FIG. 1 depicts a simplified user interface 10 that allows a user to select characters using a touch screen with a limited number of touch input regions. In one illustrative embodiment, at least a substantial portion of the touch screen acts as a single uniform input region, i.e., clicking anywhere on the screen, with the exception of a few optional auxiliary input regions, provides a uniform result. Thus, a single type of input can be generated regardless of where the screen is touched. In an alternative embodiment, a specific region of the touch screen could act as the uniform input region (e.g., a displayed button, a center portion of the screen, etc.).

Figure 2:
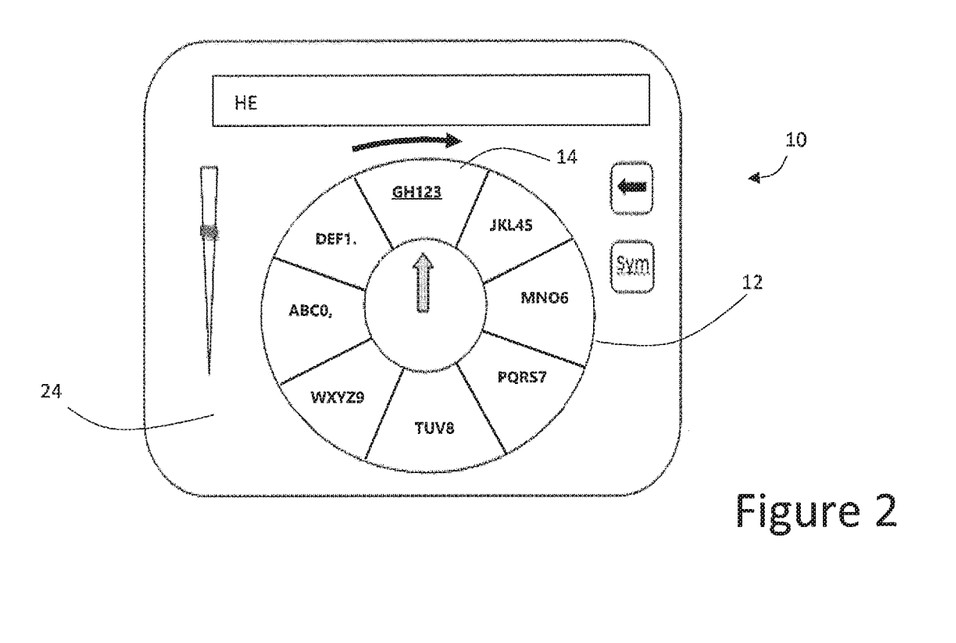
FIG. 2 shows the simplified user interface of FIG. 1 in a different position according to embodiments.
Figure 3:
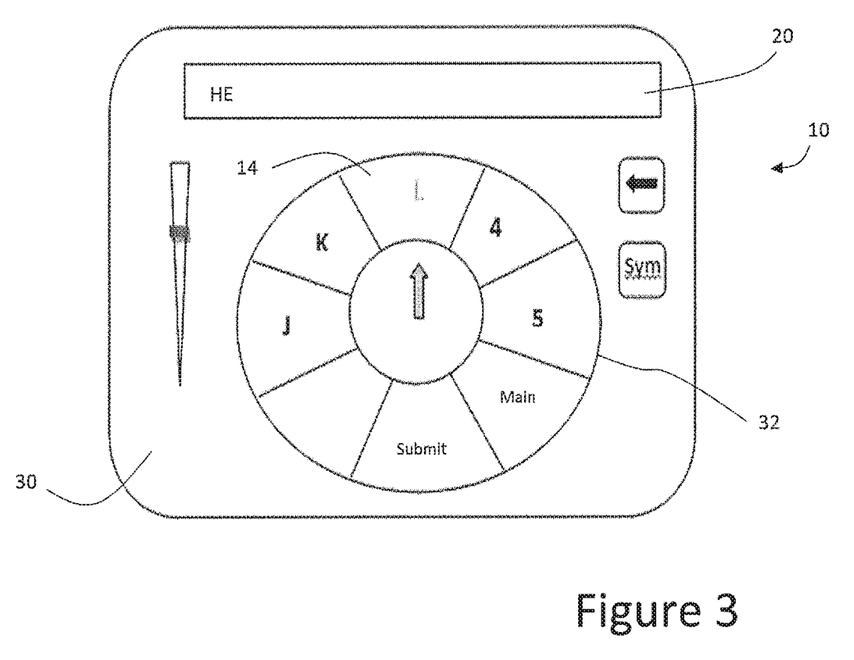
FIG. 3 shows a secondary screen of the simplified user interface according to embodiments.

Selecting characters for input using a single input region is accomplished as follows in this illustrative embodiment. To begin the process, a primary view 24 as shown in FIGS. 1 and 2 is rendered when the interface 10 is activated, e.g., powered up, woken up via a touch, etc. The interface 10 utilizes a rotatable feature, in this case a wheel 12 of character sets. When the user activates the interface 10, the wheel 12 automatically begins rotating in the direction of arrow 17. Each section of the wheel 12 in the primary view 24 contains a set of characters, punctuation and/or symbols, e.g., "DEF1.", "GHI23", etc., referred to generally herein as character sets. In this example, the wheel 12 includes eight character sets, although more or less could be utilized. When a character set rotates to the topmost position as indicated with arrow 16, the set is in the active position 14, which may be highlighted, underlined, etc., to visually assist the user. Thus, as the wheel 12 rotates, each set is momentarily (e.g., for one or two seconds) moved into the active position 14, until the next set is moved therein. For example, FIG. 2 shows the wheel 12 rotated one position from that depicted in FIG. 1.

Note that the speed of the rotation can be set to particular speed or be user adjusted with an optional slide bar 18 (or via other input mechanisms, such as physical buttons).

When a character set containing a desired character (e.g., "L") appears in the active position 14, the user simply touches the interface 10 anywhere (except for any auxiliary input regions if used) to select the desired character set. Touching the interface 10 to select a character set causes a secondary view 30 to be displayed as shown in FIG. 3. The secondary view 30 will likewise display a rotating wheel 32, however in this case, the individual characters from the selected character set will appear on individual sections of the wheel 32 as shown Like the primary view 24, the topmost position in the secondary view provides the active position 14, and the wheel 32 will rotate from section to section such that each character is sequentially moved into the active position 14 for a brief period of time. When a desired letter (e.g., "L") appears in the active position 14, the user can touch the interface 10 again to select the letter. The selected letter will then appear in the display window 20. Depending on the implementation, the interface 10 may or may not default back to the primary view 24 after a character is selected. In addition to showing each of the letters from a character set in the secondary view 30, additional navigation or operational options may be provided on the wheel 32. For example, "main" may be provided as an option to allow the user to return to the primary view 24 without selecting a character. Similarly, a "submit" option may be provided to allow the user to submit a complete string of information for processing. For example, if the user entered information in response to an interface-based query (e.g., "please enter your first name"), the submit option could be utilized to indicate that the selected string of characters is complete and ready for processing.

As shown in FIGS. 1-3, interface 10 may include optional auxiliary input regions 18, 22, 26 (e.g., shortcut keys) that provide additional functionality not on the wheel. For example, a slider bar 18 may be provided to control the speed of the wheel rotation, a backspace key 22 may be provided to erase an entered character, and/or a SYM key may be provided to switch to a symbol mode that displays symbols instead of characters (e.g., = & % $, emoji's, etc.). A submit option (not shown) may also be included as an optional input region to submit/enter a character string for processing. Note that the auxiliary input regions 18, 22, 26 are optional in that they could be left off the interface 10 or located elsewhere on an associated device.

The operation for selecting symbols may be implemented in a similar manner as characters, namely, a primary view would show a wheel in which each section would include a selectable set of symbols and a secondary view would show a wheel with individual symbols.

It is also noted that while the rotating feature is shown as a wheel, any type of rotating display for sequentially displaying character sets and characters may be utilized (e.g., a rolling scroll, a rotating polygon, etc.).

Figure 4:
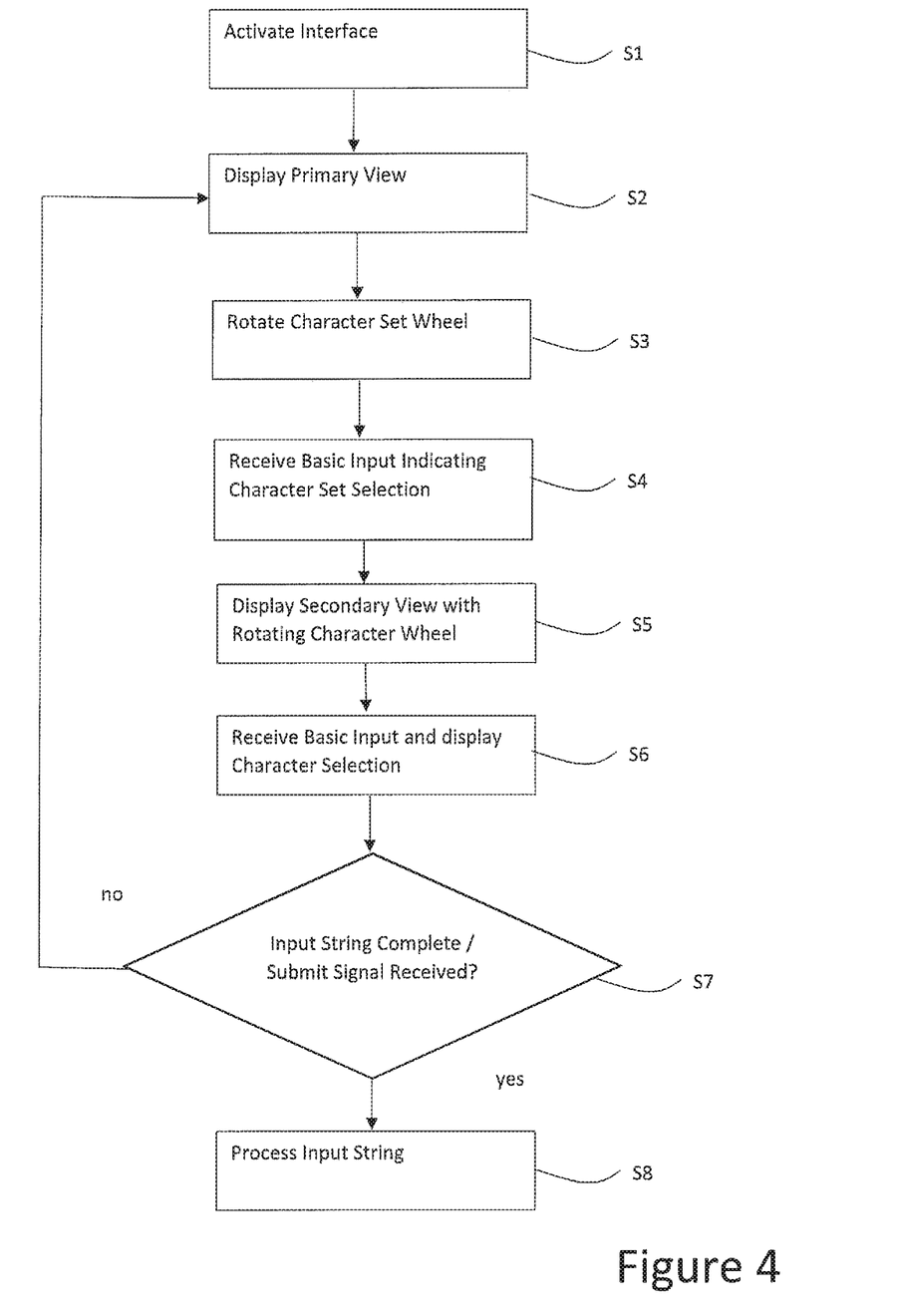
FIG. 4 depicts a flow diagram showing a method of using the simplified user interface according to embodiments.

FIG. 4 depicts a flow diagram showing a process for implementing the simplified interface 10 described in FIGS. 1-3 for collecting an input string. At S1, the interface 10 is activated, e.g., via a power up, wakeup, etc., and at S2, the primary view 24 is displayed. At S3, the character set wheel 12 (FIGS. 1-2) is rotated such that different character sets are sequentially positioned into the active position 14. At S4, a first uniform input is received via a touch of the interface 10 indicating a character set selection, and at S5 a secondary view (FIG. 3) is displayed with a rotating character wheel 32 in which characters from the selected character set are sequentially positioned in the active position 14. At S6, a second uniform input is received indicating that a character has been selected and the selected character is displayed in the display window 20 on the interface 10. Next at S7, a determination is made whether the input string is complete. This may be determined in response to a submit signal inputted by the user, e.g., via an auxiliary input region, via a selected wheel input, etc. Alternatively, the completion of the input string may be determined based on a set number of characters being entered (e.g., 10 digits for a phone number, 20 characters for a warranty number, six digits for a date, etc.). If the input string is not complete, then control returns to S2. If completed, then at S8, the input string is processed and the data input is completed.

Figure 5:
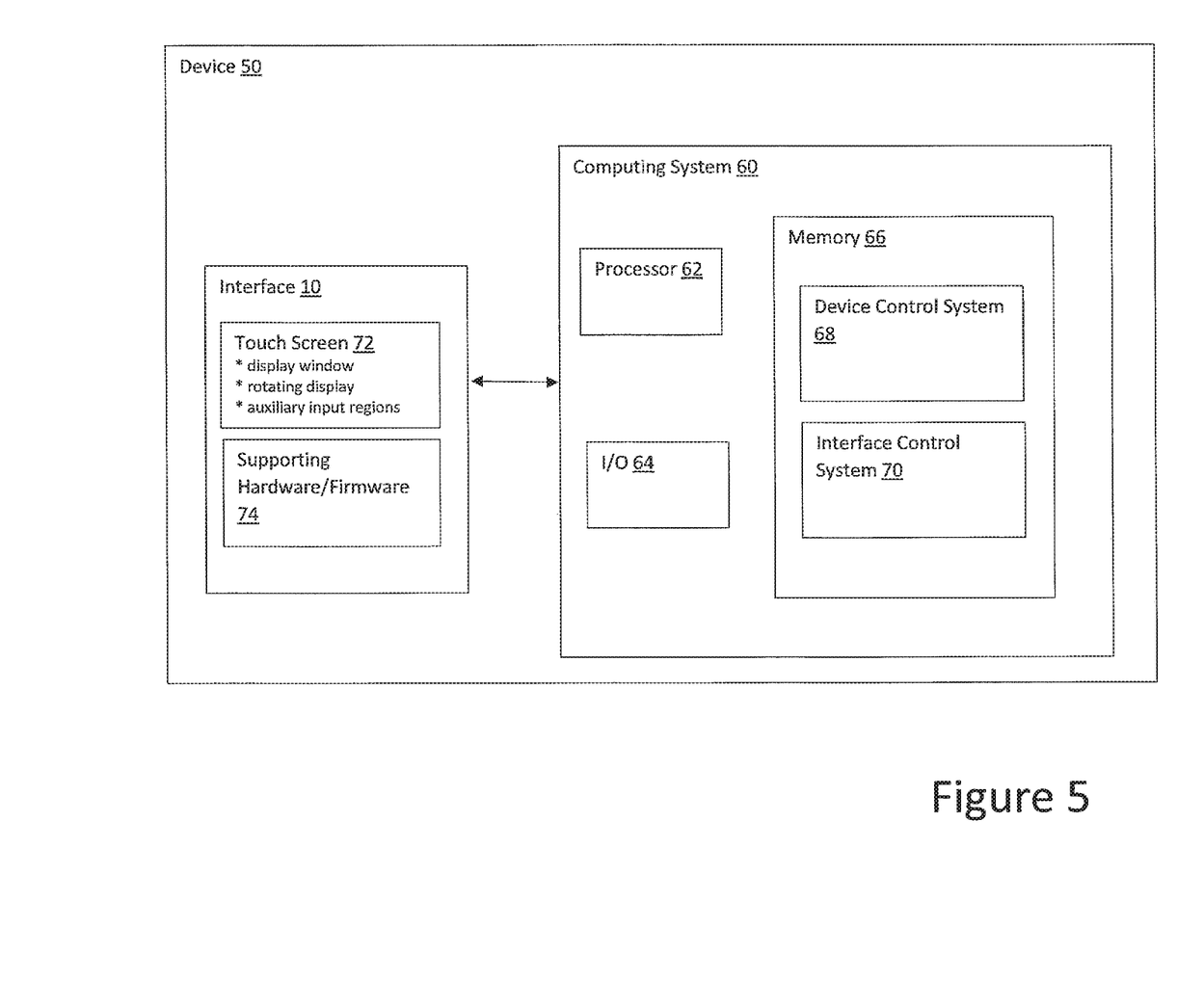
FIG. 5 depicts a device having the simplified user interface according to embodiments.

FIG. 5 depicts a device 50 that incorporates the simplified interface 10 described herein. Device 50 may include any wearable, IoT appliance, or other apparatus in which character strings may need to be input from a user to setup or control the device 50. In this illustrative embodiment, interface 10 includes a touch screen 72 capable of receiving at least a uniform touch input, a display window for displaying entered characters, and a rotating display for displaying character sets (primary view) and characters (secondary view). Optional auxiliary touch input regions may also be provided as described herein. In addition, interface 10 may include supporting hardware/firmware 74 for controlling at least some aspects of the interface 10, e.g., determining which view to display, capturing and processing touch inputs, caching entered characters, etc.

In this example, device 50 also includes a computing system 60 operationally coupled to the interface 10 that includes a device control system 68 for controlling the device 50. Device control system 68 may control any aspect of the device, including, e.g., communications, operations, etc., and whose operation will largely depend on the type of device 50 being implemented. For example, a smart fitness sneaker may track how many steps were taken by the user, and calculate and display calories burned, goals achieved, etc. User preferences, goals and the like may be inputted via the interface 10.

In one illustrative embodiment, computing system 60 may also include an interface control system 70 in which some or all of the processing aspects of the interface 10 are handled. For example, interface control system 70 can control the rendering of the primary and secondary views, determine how characters and character sets are displayed on the interface 10, determine how to capture data, implement sleep or power down modes, display queries, display feedback and other informational views, display entered characters, implement the symbol mode, etc. Alternatively, such logic could be hardcoded directly into, or be shared with, the supporting hardware/firmware 74 of interface 10. It is also noted that computing system 60 could be implemented remotely from the interface 10, e.g., on a smart phone, server, cloud system etc. Furthermore, device 50 may be distributed device in which different components are physically located apart from each other.

It is understood that device control system 68 and/or interface control system 70 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 60 that may comprise any type of computing device and for example includes at least one processor 62, memory 66, an input/output (I/O) 64 (e.g., one or more I/O interfaces and/or devices), and a communications pathway. In general, processor(s) 62 execute program code which is at least partially fixed in memory 66. While executing program code, processor(s) 62 can process data, which can result in reading and/or writing transformed data from/to memory and/or I/O 64 for further processing. A pathway provides a communications link between each of the components in computing system 60. I/O 64 can comprise one or more human I/O devices, which enable a user to interact with computing system 60. Computing system 60 may also be implemented in a distributed manner such that different components reside in different physical locations.

Furthermore, it is understood that the device control system 18, interface control system 70, or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A device comprising a touch screen, the touch screen configured to display a touch screen interface, the touch screen interface comprising:
a primary view that displays a plurality of rotating character sets on a wheel, wherein each one of the character sets sequentially rotates into a fixed active position automatically upon display of the primary view on the touch screen, wherein a character set in the active position is selectable in response to a first touch anywhere in a uniform input region, and wherein the wheel automatically begins rotating when a user activates the touch screen interface;
a secondary view that replaces the primary view and displays a plurality of rotating characters on the wheel, wherein each one of the rotating characters sequentially rotates into the active position automatically after display of the secondary view on the touch screen, wherein a character in the active position is selectable in response to a second touch anywhere in the uniform input region; and
a window for displaying characters selected from the secondary view,
wherein the plurality of rotating characters displayed in the secondary view are determined based on the character set selected in the primary view in response to the first touch,
wherein the uniform input region comprises an entire surface area of the touch screen excluding any auxiliary input regions, and
wherein a first auxiliary input region controls a speed of the automatic rotation.

2. The device of claim 1, wherein the first auxiliary input region includes a slide bar.

3. The device of claim 1, wherein a second auxiliary input region permits switching to a symbol mode for displaying and selecting symbols.

4. The device of claim 1, wherein character sets and characters in the active position are highlighted.

5. A computer program product stored on a computer readable storage medium, which when executed by a computing system, controls a touch screen, the touch screen configured to display a touch screen interface, the computer program product comprising:
program code for generating a primary view that displays a plurality of rotating character sets on a wheel, wherein each one of the character sets sequentially rotates into a fixed active position automatically upon display of the primary view on the touch screen, wherein a character set in the active position is selectable in response to a first touch anywhere in a uniform input region, and wherein the wheel automatically begins rotating when a user activates the touch screen interface;
program code for generating a secondary view that replaces the primary view and displays a plurality of rotating characters on the wheel, wherein each one of the rotating characters sequentially rotates into the active position automatically after display of the secondary view on the touch screen, wherein a character in the active position is selectable in response to a second touch anywhere in the uniform input region; and program code for generating a window for displaying characters selected from the secondary view, wherein the plurality of rotating characters displayed in the secondary view are determined based on the character set selected in the primary view in response to the first touch, wherein the uniform input region comprises an entire surface area of the touch screen excluding any auxiliary input regions, and wherein a first auxiliary input region controls a speed of the automatic rotation.

6. The program product of claim 5, wherein the first auxiliary input region includes a slide bar.

7. The program product of claim 5, further comprising program code that permits switching to a symbol mode for displaying and selecting symbols.

8. The program product of claim 5, wherein character sets and characters in the active position are highlighted.

9. A method for implementing a touch screen configured to display a touch screen interface, the method comprising:
   rendering a primary view that displays a plurality of rotating character sets on a wheel, wherein each one of the character sets sequentially rotates into a fixed active position automatically upon display of the primary view on the touch screen, wherein a character set in the active position is selectable in response to a first touch anywhere in a uniform input region, and wherein the wheel automatically begins rotating when a user activates the touch screen interface;

rendering a secondary view that replaces the primary view and displays a plurality of rotating characters on the wheel, wherein each one of the rotating characters sequentially rotates into the active position automatically after display of the secondary view on the touch screen, wherein a character in the active position is selectable in response to a second touch anywhere in the uniform input region; and rendering a window for displaying characters selected from the secondary view, wherein the plurality of rotating characters displayed in the secondary view are determined based on the character set selected in the primary view in response to the first touch, wherein the uniform input region comprises an entire surface area of the touch screen excluding any auxiliary input regions, and wherein a first auxiliary input region controls a speed of the automatic rotation.

10. The method of claim 9, wherein the first auxiliary input region is a slide bar.

11. The method of claim 9, wherein character sets and characters in the active position are highlighted.

12. The method of claim 9, further comprising rendering a symbol mode for displaying and selecting symbols.

* * * * *